US 9,564,773 B2

(12) United States Patent
Pogorelik et al.

(10) Patent No.: US 9,564,773 B2
(45) Date of Patent: Feb. 7, 2017

(54) METHODS AND SYSTEMS FOR OPTIMIZING LOCATION-BASED WIRELESS CHARGING

(71) Applicants: Oleg Pogorelik, Lapid (IL); Adi Shaliv, Nir-Banim (IL); Justin Lipman, Shanghai (CN); Shahar Porat, Geva Carmel (IL)

(72) Inventors: Oleg Pogorelik, Lapid (IL); Adi Shaliv, Nir-Banim (IL); Justin Lipman, Shanghai (CN); Shahar Porat, Geva Carmel (IL)

(73) Assignee: Intel IP Corportation, Santa Clara, CA (US)

( * ) Notice: Subject to any disclaimer, the term of this patent is extended or adjusted under 35 U.S.C. 154(b) by 41 days.

(21) Appl. No.: 14/495,370

(22) Filed: Sep. 24, 2014

(65) Prior Publication Data

US 2016/0087486 A1    Mar. 24, 2016

(51) Int. Cl.
 *H02J 7/00* (2006.01)
 *H02J 7/04* (2006.01)
 *H02J 7/02* (2016.01)
 *H04B 5/00* (2006.01)

(52) U.S. Cl.
 CPC ............. *H02J 7/042* (2013.01); *H02J 7/025* (2013.01); *H04B 5/0037* (2013.01); *H04B 5/0043* (2013.01); *H02J 50/90* (2016.02)

(58) Field of Classification Search
 CPC .......... Y02E 60/12; H02J 7/025; H01F 38/14; Y02T 90/122; B60L 11/182
 USPC ......................................... 320/108
 See application file for complete search history.

(56) References Cited

U.S. PATENT DOCUMENTS

| | | | |
|---|---|---|---|
| 2004/0142733 A1 | 7/2004 | Parise | |
| 2007/0010259 A1* | 1/2007 | Hoffmann | H04B 17/309 455/456.1 |
| 2011/0115433 A1 | 5/2011 | Lee et al. | |
| 2012/0187851 A1* | 7/2012 | Huggins | H02J 7/025 315/159 |

(Continued)

OTHER PUBLICATIONS

International Search Report and Written Opinion for PCT Application No. PCT/US2015/046480 mailed Nov. 27, 2015.

*Primary Examiner* — Richard Isla Rodas
*Assistant Examiner* — Mohammed J Sharief
(74) *Attorney, Agent, or Firm* — Sutherland Asbill & Brennan LLP

(57) ABSTRACT

Methods and systems for optimizing wireless charging are provided. The method may include identifying, by a charging controller, charging apparatus location information associated with a wireless charging apparatus configured to direct charging beams, and identifying, by the charging controller, an optimal charging zone of the wireless charging apparatus based at least in part on the charging apparatus location information. The method may include receiving, by the charging controller, a first location information associated with a mobile device, and determining, by the charging controller, a first proximity of the mobile device to the optimal charging zone of the wireless charging apparatus based at least in part on the first location information. The method may include transmitting, by the charging controller, first optimal charging indicator information to the mobile device, the first optimal charging indicator information based at least in part on the first proximity.

23 Claims, 5 Drawing Sheets

(56) References Cited

U.S. PATENT DOCUMENTS

| | | | |
|---|---|---|---|
| 2012/0326660 A1 | 12/2012 | Lu et al. | |
| 2013/0134927 A1* | 5/2013 | Park | H04B 5/0037 320/107 |
| 2013/0137455 A1 | 5/2013 | Xia et al. | |
| 2013/0143594 A1* | 6/2013 | Ghabra | H04W 24/00 455/456.1 |
| 2014/0206384 A1 | 7/2014 | Kim et al. | |
| 2015/0073642 A1* | 3/2015 | Widmer | G01C 21/36 701/22 |

* cited by examiner

METHODS AND SYSTEMS FOR OPTIMIZING LOCATION-BASED WIRELESS CHARGING

TECHNICAL FIELD

This disclosure generally relates to wireless charging, and more particularly to methods and systems for location-based wireless charging.

BACKGROUND

Mobile devices have become an integral part of the computing landscape. As mobile devices become more capable, they have shifted to perform tasks that have traditionally been performed by non-mobile computers. In one example, mobile devices may have the ability to stream media, display videos, or otherwise process large amounts of data over the course of a day. The increasing use of mobile devices by consumers, along with the high dynamic range of power consumption across mobile devices, may cause a power source or battery of the mobile device to become depleted. As a result, the mobile device may need to be frequently charged. Consumers may also have multiple mobile devices that need to be charged. Charging systems, however, may not optimally charge mobile devices. Accordingly, methods and systems for optimizing charging of mobile devices may be desired.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
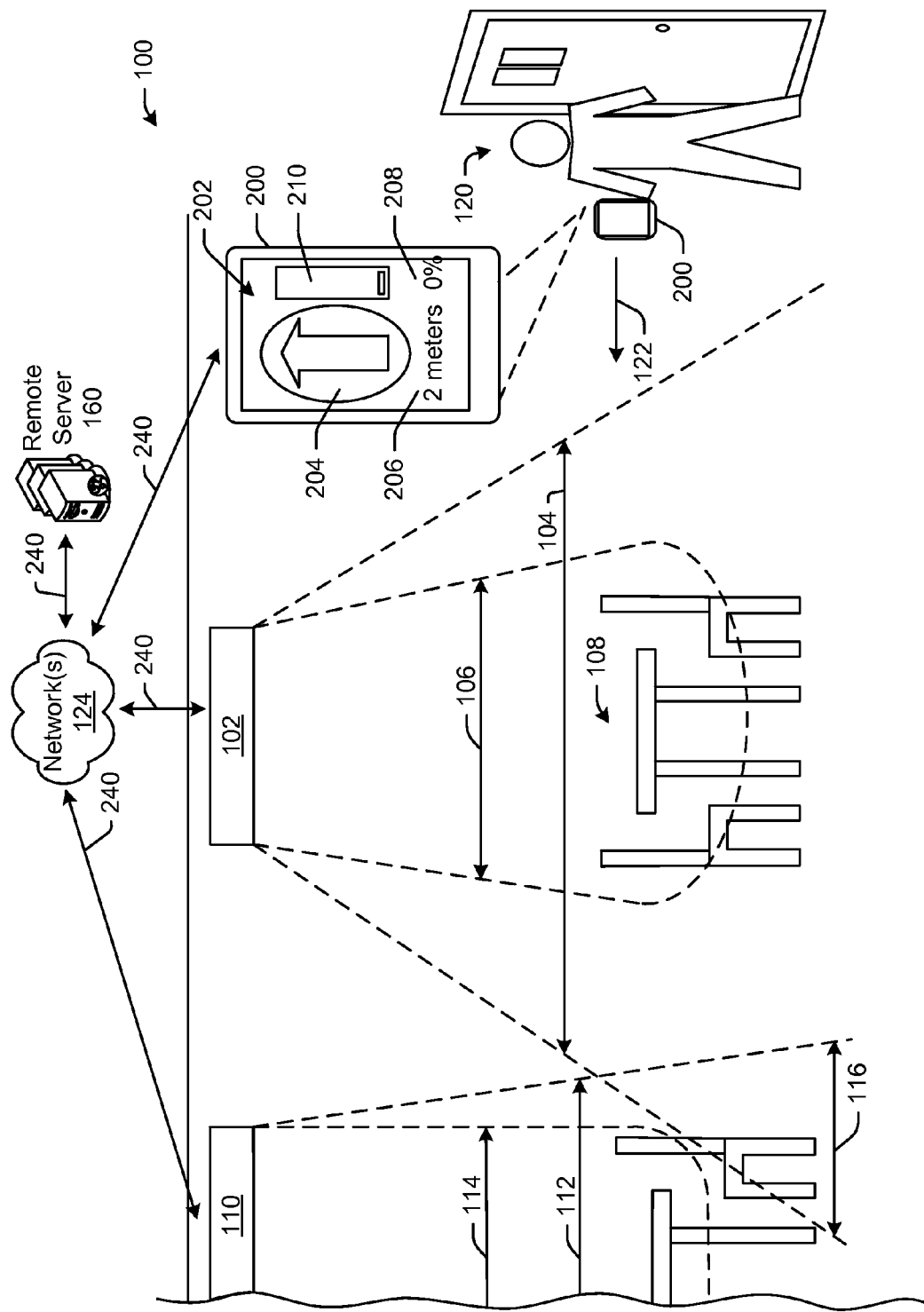
FIG. 1 is an illustrative schematic diagram of a wireless charging system, in accordance with certain example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Example embodiments of the disclosure may provide methods and systems for optimizing wireless charging of mobile devices such as, but not limited to, mobile communication devices, laptops, smartphones, tablets, smart boards, internet of things devices (e.g., home appliances), wearables (including headsets, watches, health monitors, etc.), sensors, microphones, speakers, or other mobile devices powered by depletable power sources. Example embodiments may include one or more mobile devices wirelessly connected to a charging system. The charging system may be configured to wirelessly charge, or provide power defined as energy per unit time, to connected mobile devices. In some instances, the charging system may be configured to wirelessly charge connected mobile devices at a distance of more than about 5 meters, such as 10 meters or more. The charging system may implement or otherwise include, but is not limited to, magnetic resonance, capacitive, and/or inductive wireless charging technology, for example, to wirelessly charge or distribute power to connected mobile devices.

The charging system may have an optimal charging zone. The optimal charging zone may be an area at which the charging system directs relatively stronger signals or charging beams, resulting in more efficient wireless charging. Therefore, a mobile device positioned within the optimal charging zone may be charged more quickly than a mobile device positioned outside of the optimal charging zone. In some embodiments of the present disclosure, the charging system may have a static optimal charging zone, where the optimal charging zone may be fixed or may not otherwise be dynamically adjusted. In other embodiments of the present disclosure, the charging system may have a dynamic optimal charging zone, where the optimal charging zone may be automatically and/or dynamically adjusted. In one such example, a dynamic optimal charging zone may be adjusted by modifying a phase or an amplitude of the charging beams directed by the charging system, thereby altering a directionality of the charging beams and adjusting the optimal charging zone.

In embodiments of the present disclosure with static optimal charging zones, mobile devices may be able to determine where the optimal charging zone of the charging system is located, which may therefore allow users to position a mobile device accordingly, resulting in improved charging efficiency and reduced power waste. In embodiments of the present disclosure with dynamic optimal charging zones, the charging systems described herein may automatically adjust an initial optimal charging zone to cover mobile devices positioned outside of the initial optimal charging zone, resulting in improved charging efficiency and reduced power waste. The charging systems of the present disclosure therefore provide optimized wireless charging, resulting in improved user experience at the charging system because connected mobile devices may be more efficiently charged, and power waste may be reduced.

In example embodiments, the mobile devices discussed herein may have one or more antennas and/or transceivers, such as antennas and/or transceivers (e.g., radios) for wirelessly communicating with, for example, one another and/or the charging system. Sample forms of wireless communication may include WiFi, WiFi Direct™, BLUETOOTH™, BLUETOOTH LE™, Near Field Communication, and other suitable forms of wireless communication. In example embodiments, the mobile devices may be configured to wirelessly receive energy from the charging system. For example, the mobile devices may include resonators for engaging in a resonant magnetic induction energy transfer with the charging system.

It will be appreciated that in example embodiments, the methods and systems described herein may provide for, and result in, increased functionality for mobile devices, and/or optimized and efficient wireless charging of mobile devices by either assisting users in identifying an optimal charging zone of the charging system or by adjusting the optimal charging zone of the charging system to accommodate charging of a mobile device.

Some example elements involved in the operation of the methods, systems, and apparatuses disclosed herein may be better understood with reference to the figures. Referring to FIG. 1, a simplified schematic illustration of an exemplary wireless charging system 100 in accordance with embodiments of the disclosure is depicted.

In the illustrated embodiment, the charging system 100 includes a first wireless charging apparatus 102 and a second wireless charging apparatus 110, each of which may be integrated, or otherwise associated, with an access point, for example. FIG. 1 also depicts a user 120 with a mobile device 200 and a remote server 160. The first and second wireless charging apparatuses 102, 110, the mobile device 200, and the remote server 160 may be wirelessly connected 240 to a network 124. The network 124 may be configured to allow wireless communication between any or all of the connected components. The first and second wireless charging apparatuses 102, 110 are illustrated mounted on a ceiling. In other embodiments, the first and second wireless charging apparatuses 102, 110 may be mounted elsewhere, such as at or near a floor or a table. In some embodiments, the first and second wireless charging apparatuses 102, 110 may be integrated into other items, such as furniture, including desks, tables, chairs, car seats, airplane seats, and the like. FIG. 1 is merely illustrative, because the charging system 100 described herein may be positioned in different environments. Contemplated environments include, but are not limited to, automotive applications, industrial applications, medical applications, and military applications, among others. In some embodiments, portions of the charging system 100 may be remotely located, such as the remote server 160. In other embodiments of the present disclosure, additional or fewer mobile devices and/or wireless charging apparatuses may be included.

The first and second wireless charging apparatuses 102, 110 may be configured to wirelessly charge mobile devices, such as the mobile device 200, by directing charging beams to the mobile device. Charging beams may transfer energy via resonant magnetic coupling, in some embodiments, between two devices with approximately equal natural frequencies. Charging beams may be manipulated or adjusted, in such embodiments, by changing a natural frequency of a charging beam, or by modifying a phase and/or a magnitude of the charging beam. Beam steering for electromagnetic fields created by the first and/or second wireless charging apparatuses 102, 110 may be mechanical, electrical, or a combination thereof. For example, a mechanical approach leveraging x-y servos may be used to adjust the direction of the transmitter coil at the charging apparatus and hence the magnetic field towards the receiver coil at the user device being charged. Another example includes using an iron cone shaped object where the iron cone can be used to confine the field towards a direction. Alternatively, the use of a set of steering coils or a phased array approach might prove feasible in directing the field.

In some embodiments, the first and second wireless charging apparatuses 102, 110 may be configured to charge mobile devices from a distance of about 2 meters, of about 5 meters, of about 10 meters, or more. As discussed above, the first and second wireless charging apparatuses 102, 110 may have either static or dynamic optimal charging zones. In the embodiment of FIG. 1, the first and second wireless charging apparatuses 102, 110 have static optimal charging zones. The optimal charging zone of each wireless charging apparatus may be an area or a region where the wireless charging apparatus can direct a stronger signal or charging beam, which may allow mobile devices positioned in that area or region to receive wireless charge more efficiently than at a position outside the optimal charging zone. For example, in FIG. 1, the first wireless charging apparatus 102 may have a total coverage area 104. The total coverage area 104 may be the entire area covered by charging beams directed by the first wireless charging apparatus 102. An optimal charging zone 106 may be a portion of the total coverage area 104 at which the first wireless charging apparatus 102 can focus or otherwise direct a stronger charging signal or beam. For example, mobile devices positioned within the optimal charging zone 106 may be able to receive charge at a predetermined efficiency threshold. In some embodiments, the predetermined efficiency threshold may be 60%, 70%, 80%, 90%, or more. The predetermined efficiency threshold may be adjustable by users of the charging system 100, and may be an approximation. In FIG. 1, the optimal charging zone 106 of the first wireless charging apparatus 102 is illustrated as substantially aligned with the first wireless charging apparatus 102, such that the mobile devices positioned at location 108, for example on the illustrated table, will be within the optimal charging zone 106. While a mobile device positioned anywhere within the total coverage area 104 will be able to receive wireless charge from the first wireless charging apparatus 102, mobile devices within the optimal charging zone 106 may receive a more efficient charge. Although shown as planar in FIG. 1, for illustrative purposes only, it is understood that both the total coverage area 104 and the optimal charging zone 106 may cover three-dimensional spaces. In some embodiments of the present disclosure, the total coverage area 104 may be omni-directional.

Similarly, the second wireless charging apparatus 110 may have a total coverage area 112 with an optimal charging zone 114. The optimal charging zone 114 may again be aligned with the second wireless charging apparatus 110, for example, to ensure the optimal charging zone 114 covers furniture or another high traffic area for users with mobile devices. For embodiments of the present disclosure with static optimal charging zones, such as the illustrated embodiment in FIG. 1, the optimal charging zones 106, 114 may be adjusted by manual configuration or reconfiguration of the associated wireless charging apparatuses.

As shown in FIG. 1, in some instances, the total coverage area 104 of the first wireless charging apparatus 102 may overlap or otherwise coincide with the total coverage area 112 of the second wireless charging apparatus 110 at an overlap area 116. The overlap area 116 may be an area with excessive interference, where charging beams directed by the first wireless charging apparatus 102 collide or otherwise interfere with charging beams directed by the second wireless charging apparatus 110. As a result, mobile devices positioned in the overlap area 116 may not receive optimal wireless charging from either the first wireless charging apparatus 102 or the second wireless charging apparatus 110. The overlap area 116 may also contribute to power waste because mobile devices positioned in the overlap area 116 may be receiving inefficient, if any, wireless charge. Because the charging beams directed by the first and second wireless charging apparatuses 102, 110 may not be visible, users may be unable to visually determine whether or not their respective mobile devices are positioned in an optimal charging zone, for example optimal charging zone 106, or in an overlap area, such as overlap area 116.

Embodiments of the present disclosure may allow users to position mobile devices in the optimal charging zone of a wireless charging apparatus. Embodiments of the present disclosure may allow the optimal charging zone of a wireless charging apparatus to be adjusted to include mobile devices initially positioned outside of the optimal charging zone. For example, in FIG. 1, where the first wireless charging apparatus 102 has the static optimal charging zone 106, the user 120 may have the mobile device 200. The user 120 may enter the environment with the wireless charging system 100 and, as will be described in detail herein, the mobile device 200 may establish a wireless connection 240 with the charging system 100, and more specifically with the remote server 160 and/or the first wireless charging apparatus 102. The charging system 100 may identify, for example, location information for the first wireless charging apparatus 102, which may include Global Positioning Satellite (GPS) coordinates or other location information of the first wireless charging apparatus 102. The charging system 100 may identify the positioning of the optimal charging zone 106 associated with the first wireless charging apparatus 102 based at least in part on the first charging apparatus location information. The charging system 100 may receive location information, such as GPS coordinates, from the mobile device 200, and may determine a proximity of the mobile device 200 to the optimal charging zone 106, based at least in part on the mobile device location information, as described herein. In another example, the charging system 100 may determine the proximity to a point source (optimal point for charging). The point source could be a wireless beacon (e.g., RSSI based) or ultrasonic beacon (time of flight) distance from the point source, the closer to which is more desirable. This could be reversed, such that instead of the charging device detecting the point source, the device itself may emit a beacon and the charging system 100 can use trilateration (given three detectors) to then steer the beam towards one or more devices. For indoor locations, one embodiment of the charging system 100 may determine proximity of the device to the charging apparatus via wireless beacons (e.g., WiFi, Bluetooth, 60 GHz) based on RSSI or time of flight measurements. In other embodiments, the ultrasound based time of flight may be determined by the charging system 100.

The charging system 100 may transmit optimal charging indicator information to the mobile device 200, based at least in part on the proximity. As shown in FIG. 1, the optimal charging indicator information may be presented on a user interface 202 of the mobile device 200 and may include directional guidance 204, proximity information 206, optimization percentage information 208, and/or optimization level information 210. The user interface 202 may include additional or fewer elements in other embodiments. The directional guidance 204 may indicate a direction in which the optimal charging zone 106 is located, with respect to the mobile device 200. For example, the directional guidance 204 may indicate to the user 120 that the optimal charging zone 106 is located in direction 122, or directly in front of the user 120. The proximity information 206 may indicate a distance from the mobile device 200 to the optimal charging zone 106, which may be, for example, 2 meters. The optimization percentage information 208 may be an indication of an approximate percentage of charging efficiency for the mobile device 200 and the first wireless charging apparatus 102. For example, because the mobile device 200 is positioned outside of the total coverage area 104 of the first wireless charging apparatus 102, the optimization percentage information 208 in FIG. 1 indicates an approximate charging efficiency of 0% since the mobile device 200 is not a getting wireless charge from the first wireless charging apparatus 102 The optimization level information 210 may provide a graphical representation of charging efficiency, for example, by illustrating a level of current charge efficiency, and may be based at least in part on a number of devices connected to the first wireless charging apparatus 102. The user interface 202 is described in detail below.

Figure 2:
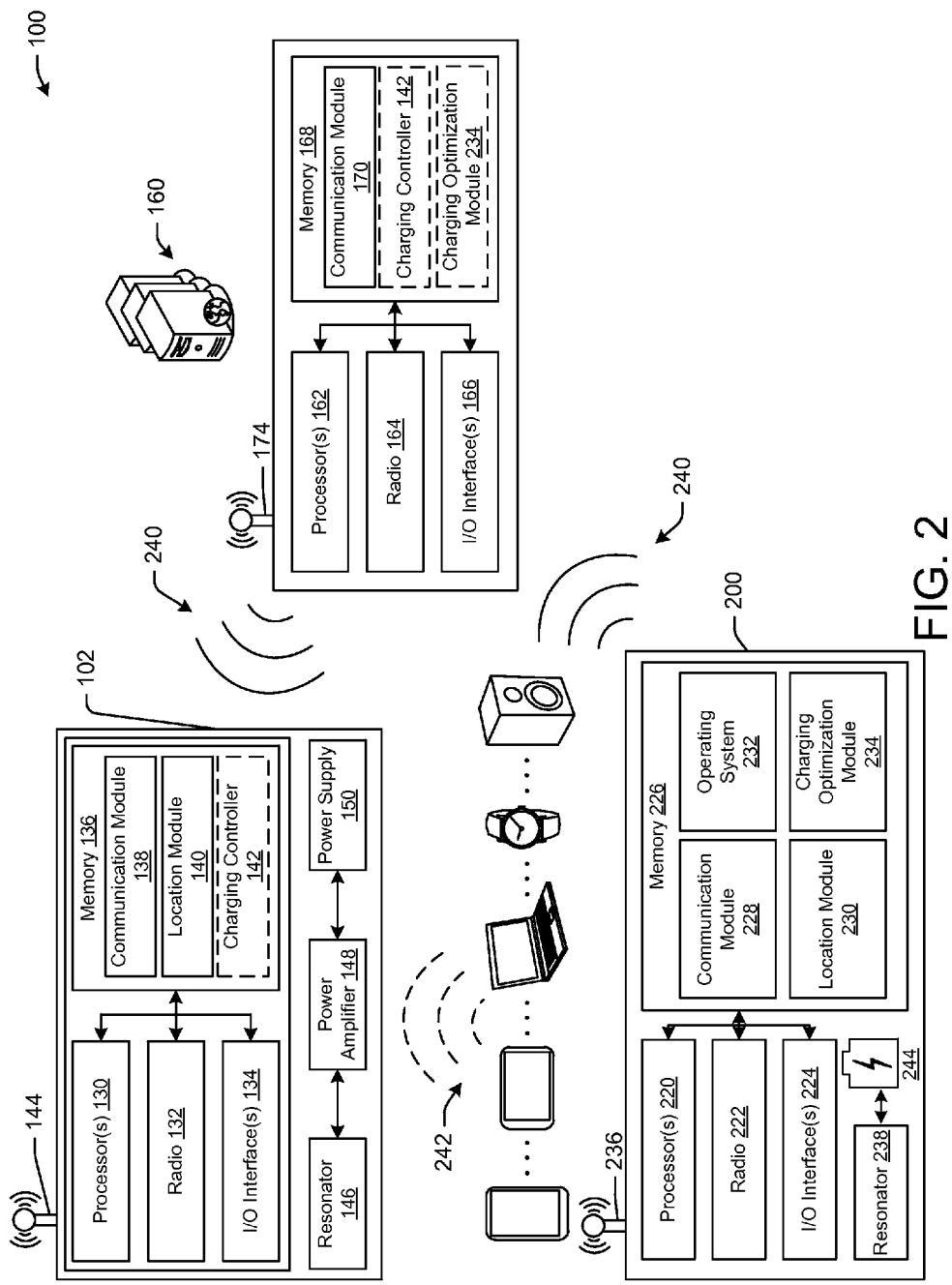
FIG. 2 is a schematic diagram of the wireless charging system of FIG. 1, in accordance with certain example embodiments of the disclosure.

Referring now to FIG. 2, one embodiment of the charging system 100 is schematically illustrated. Either or both of the first wireless charging apparatus 102 and the mobile device 200 may be in wireless communication 240 with the remote server 160. In some embodiments, the first wireless charging apparatus 102 and the mobile device 200 may be in wireless communication 242 with each other, either in addition to, or instead of, wireless communication 240 with the remote server 160. The charging system 100 may establish wireless communication 240 through any wireless protocol, for example through a beacon or a handshake process, where a component of the charging system 100 emits a beacon, and the receiving device responds to the beacon to establish the wireless communication 240.

The first wireless charging apparatus 102 may be any suitable device configured to wirelessly charge connected mobile devices. In some embodiments, the first wireless charging apparatus 102 may incorporate charging protocol established by the Alliance for Wireless Power (A4WP) standard. In the illustrated embodiment, the first wireless charging apparatus 102 includes one or more processor(s) 130, a radio 132, and an input/output interface (I/O) 134. Each component 130, 132, 134 may be communicatively coupled to a memory 136. The memory 136 includes a communication module 138 and a location module 140. The memory 136 may optionally include a charging controller 142. In some embodiments, the remote server 160 may include the charging controller 142. The communication module 138 may be configured to receive and/or transmit data to and from the remote server 160 and/or the mobile device 200. The location module 140 may be configured to determine location information for the first wireless charging apparatus 102. Location information for wireless charging apparatuses and/or mobile devices may include GPS coordinates, relative positioning obtained via beacon transmission and response, triangulation from WiFi connections, GNSS signals, ultrasound sensors, and/or inertial sensors. Location information may include the absolute position and/or the relative position of the wireless charging apparatus and/or the mobile device. The location information, in some example cases, may be latitude, longitude, and/or altitude information ascertained from GNSS signals and a GNSS receiver of the wireless charging apparatus or mobile device. In some examples, the location information may be relative location information that may be ascertained from a previously determined location by multi-axis accelerometers. For example, a change in position from a first location at a first time to a second location at a second time may be determined by manipulating accelerometer sensor output, such as by performing an algorithm including determining a double integral with respect to time of the accelerometer output for each of the multiple axes.

The charging controller 142 may be configured to optimize wireless charging of a mobile device connected to the first wireless charging apparatus 102, using, for example, the methods and systems described herein. The charging controller 142 may be any suitable electronic device, interface, or application configured to allow charging systems described herein to implement methods for optimizing wireless charging. The charging controller 142 may include a user interface configured to allow users to configure and/or customize aspects of the charging system 100. In some embodiments, one or more of the modules stored on the memory 136 of the first wireless charging apparatus 102 may be stored remotely, for example, at the remote server 160, at a web interface, or in the cloud. The remote server 160 may be wirelessly connected to the first wireless charging apparatus 102 in order to receive and/or transmit instructions. The charging controller 142 may include or may have access to charging capability information, device specifications, charger shape/style, material composition, magnetic coil size, and other information regarding connected wireless charging apparatuses and mobile devices.

The first wireless charging apparatus 102 includes an antenna 144 in communication with the radio 132. The first wireless charging apparatus 102 also includes a resonator 146 that may be configured to wirelessly provide or distribute power to connected mobile devices. The first wireless charging apparatus 102 may also include a power amplifier 148 electrically coupled to a power supply 150 and the resonator 146. The first wireless charging apparatus 102 may be connected to an external power source from which the first wireless charging apparatus 102 receives energy. In some embodiments, the first wireless charging apparatus 102 may further include a battery or another energy storage device configured to store power received from the external power source. Although each of these components is shown in the illustrated embodiment, other embodiments may include additional or fewer components. For example, the first wireless charging apparatus 102 may include capacitive charging technology, contact ultrasound or non-contact ultrasound technology, infrared technology, or other wireless power distribution technologies. The first wireless charging apparatus 102 may come in any shape, size, or form. For example, the first wireless charging apparatus 102 may be in the form of, or include, a mat or a sheet, or may be integrated into furniture such as tables or desktops, walls, airplane seats, chairs, armrests, electronic devices such as laptops or computers, vehicles, or other surfaces at which mobile devices are commonly placed.

The mobile device 200 may be any device configured to execute one or more applications, software, and/or instructions to provide one or more services to the charging system 100 or the mobile device user. The mobile device 200, as used herein, may be any variety of client devices, electronic devices, communication devices, and/or other user devices. The mobile device 200 may include, but is not limited to, tablet computing devices, electronic book (ebook) readers, netbook computers, Ultrabook™, notebook computers, laptop computers, desktop computers, watches or other wearables, health monitors, personal digital assistants (PDAs), smartphones, web-enabled televisions, video game consoles, smart boards, set-top boxes (STBs), or the like. While the drawings and/or specification may portray the mobile device 200 in the likeness of a smartphone, a tablet, a laptop computer, a watch, and a speaker, the disclosure is not limited to such devices. Indeed, the methods and systems described herein may apply to any mobile device or user device capable of communicating with and/or receiving power from the first wireless charging apparatus 102 of the charging system 100. The mobile devices described herein may be used by users for a variety of purposes including, but not limited to, functionality such as web browsing, business functions, communications, graphics, word processing, publishing, spreadsheets, databases, gaming, education, entertainment, media, project planning, engineering, drawing, or combinations thereof.

In the illustrated embodiment, the mobile device 200 includes one or more processor(s) 220, a radio 222, and an input/output (I/O) interface 224. Each component 220, 222, 224 may be communicatively coupled to a memory 226. The mobile device 200 further includes an antenna 236 in communication with the radio 222. The memory 226 includes a communication module 228, a location module 230, an operating system 232, and a charging optimization module 234. The communication module 228 may be a mobile application stored on the memory 226 and may be configured to retrieve or determine mobile device information associated with the mobile device 200, as well as transmit and/or receive data from either or both of the first wireless charging apparatus 102 and the remote server 160. The location module 230 may be configured to retrieve and/or determine location information associated with the mobile device 200. As discussed above, location information may include GPS coordinates, WiFi triangulation, inertial sensor input, and other location information. The operating system 232 may provide users with a guided user interface and/or may provide software logic used to control the mobile device 200. The charging optimization module 234 may be configured to execute a mobile application or otherwise retrieve, determine, and/or present information to users via a user interface, for example, of the mobile device 200. The mobile device 200 may also include a resonator 238 configured to receive resonant magnetic inductive energy wirelessly from the resonator 146 of the first wireless charging apparatus 102, and may be further configured to charge a battery 244 of the mobile device 200 by transferring energy to the battery 244. Although each of these components is shown in the illustrated embodiment, other embodiments may include additional or fewer components. In other embodiments, the mobile device 200 may include components necessary to receive and store other forms of wirelessly communicated energy, such as capacitive charging or other forms discussed herein.

The wireless charging remote server 160 includes one or more processor(s) 162, a radio 164, and an input/output (I/O) interface 166. Each component 162, 164, 166 may be communicatively coupled to a memory 168. The wireless charging remote server 160 further includes an antenna 174 in communication with the radio 164. The memory 168 includes a communication module 170, and may optionally include the charging controller 142. The memory 168 may also optionally include the charging optimization module 234. The communication module 170 may be a mobile application stored on the memory 168 and may be configured to retrieve or determine information associated with the first wireless charging apparatus 102 and/or the mobile device 200, as well as transmit and/or receive data from either or both of the first wireless charging apparatus 102 and the mobile device 200. Although each of these components is shown in the illustrated embodiment, other embodiments may include additional or fewer components.

Each respective processor 130, 162, 220 of the first wireless charging apparatus 102, the remote server 160, and the mobile device 200 may be implemented as appropriate in hardware, software, firmware, or combinations thereof. Software or firmware implementations of the processors 130, 162, 220 may include computer-executable or machine-executable instructions written in any suitable programming language to perform the various functions described. Hardware implementations of the processors 130, 162, 220 may be configured to execute computer-executable or machine-executable instructions to perform the various functions described. The processors 130, 162, 220 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The first wireless charging apparatus 102 and/or the mobile device 200 may also include a chipset (not shown) for controlling communications between one or more processors 130, 162, 220 and one or more of the other components of the first wireless charging apparatus 102 or the mobile device 200. The processors 130, 162, 220 may also include one or more application-specific integrated circuits (ASICs) or application-specific standard products (ASSPs) for handling specific data processing functions or tasks. In certain example embodiments, the first wireless charging apparatus 102 and/or the mobile device 200 may be based on an Intel® Architecture system, and the processors 130, 162, 220 and the chipset may be from a family of Intel® processors and chipsets, such as the Intel® Atom® processor family.

The I/O interfaces 134, 166, 224 included in the first wireless charging apparatus 102, the remote server 160, and the mobile device 200 may enable the use of one or more user interfaces for receiving user input and/or providing output to the user. A user may be able to administer or manage the methods and systems disclosed herein by interacting with the first wireless charging apparatus 102 or the mobile device 200 via the I/O interfaces 134, 166, 224, such as a touchscreen interface, a display, a guided user interface, or any other input/output interface. The I/O interfaces 134, 166, 224 may be in the form of a touch screen, a microphone, an accelerometer sensor, a speaker, or any other suitable I/O interfaces 134, 166, 224 that may be used by the user to interact with the first wireless charging apparatus 102 or the mobile device 200.

The memory 136 of the first wireless charging apparatus 102, as well as the memory 168 of the wireless charging remote server 160 and the memory 226 of the mobile device 200 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

Each respective memory 136, 168, 226 may store program instructions that are loadable and executable on each respective processor 130, 162, 220, as well as data generated or received during the execution of these programs. Turning to the contents of each memory 136, 168, 226 in more detail, each memory 136, 168, 226 may include several modules. Each of the modules and/or software may provide functionality for the first wireless charging apparatus 102, the remote server 160, or the mobile device 200, when executed by the processors 130, 162, 220. The modules and/or the software may or may not correspond to physical locations and/or addresses in each memory 136, 168, 226. In other words, the contents of each of the modules may not be segregated from each other and may, in fact, be stored in at least partially interleaved positions on each memory 136, 168, 226.

The memory 136, 168, 226 of the respective wireless charging apparatus 102, the remote server 160, and the mobile device 200 may also include a respective operating system. The processors 130, 162, 220 of the first wireless charging apparatus 102, the remote server 160, or the mobile device 200 may each be configured to access and execute one or more operating systems stored in the respective operating systems to operate the system functions of the electronic device. System functions, as managed by the operating system, may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

Any one or all of the memory 136, 168, 226 of the respective wireless charging apparatus 102, the remote server 160, and the mobile device 200 may include the charging controller 142 described herein. The charging controller 142 may contain instructions and/or applications thereon that may be executed by each respective processor 130, 162, 220 to provide one or more functionalities associated with the directional distribution and/or reception of wireless signals, charging beams, and/or task processing. These instructions and/or applications may, in certain aspects, interact with other modules of the first wireless charging apparatus 102, the remote server 160, and/or the mobile device 200.

The radio 132, 164, 222 of the first wireless charging apparatus 102, the remote server 160, and/or the mobile device 200 may be a transmit/receive component, such as a transceiver. The radio 132, 164, 222 may include any suitable radio(s) and/or transceiver(s) for transmitting and/or receiving radio frequency (RF) signals in the bandwidth and/or channels corresponding to the communications protocols utilized by the mobile device 200 to communicate with each other or with other user devices and/or the first wireless charging apparatus 102 or another component of the charging system 100. The radio 132, 164, 222 may include hardware and/or software to modulate communications signals according to pre-established distribution protocols. The radio 132, 164, 222 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radio 132, 164, 222, in cooperation with their respective antennas 144, 174, 236, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In alternative embodiments, non-Wi-Fi protocols may be used for communications between the first wireless charging apparatus 102 and/or the mobile device 200, such as BLUETOOTH™, BLUETOOTH™ LE, Near Field Communication, dedicated short-range communication (DSRC), or other packetized radio communications. The radio 132, 164, 222 may include any known receiver and baseband suitable for communicating via the communications protocols of the first wireless charging apparatus 102 and/or the mobile device 200. The radio 132, 164, 222 may further include a low noise amplifier (LNA), additional signal amplifiers, an analog-to-digital (A/D) converter, one or more buffers, and a digital baseband.

The antenna 144, 174, 236 included in the first wireless charging apparatus 102, the remote server 160, and the respective mobile device 200 may be configured for receiving and/or transmitting communications signals from/to each other or other components of the charging system 100, such as a charging controller directly or indirectly. The antennas 144, 174, 236 may be any suitable type of antenna corresponding to the communications protocols used by the first wireless charging apparatus 102 and/or the mobile device 200 for the particular signals received and/or transmitted via the antennas 144, 174, 236. Some non-limiting examples of suitable antennas 144, 174, 236 include directional antennas, non-directional antennas, dipole antennas, folded dipole antennas, patch antennas, multiple-input multiple-output (MIMO) antennas, or the like. Each antenna 144, 174, 236 may be communicatively coupled to a radio component to transmit and/or receive signals, such as communications signals, to and/or from the first wireless charging apparatus 102 and/or the mobile device 200.

The antennas 144, 174, 236 may be configured to receive and/or transmit signals in accordance with established standards and protocols, such as the Institute of Electrical and Electronics Engineers (IEEE) 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antennas 144, 174, 236 may be configured to receive and/or transmit non-Wi-Fi protocol signals, such as BLUETOOTH™, BLUETOOTH™ LE, Near Field Communication, dedicated short-range communication (DSRC), or other packetized radio communications.

In one example, wireless communication 240 may be initiated between the first wireless charging apparatus 102, the mobile device 200, and the remote server 160 with a beacon emitted by the first wireless charging apparatus 102, to determine if any mobile devices within range wish to connect to the charging system 100. The beacon may be emitted or transmitted by the first wireless charging apparatus 102 of the charging system 100 periodically or at predetermined time intervals using any of the above-described hardware and/or the communications module 138. The mobile device 200 may receive the beacon, using any of the above-described hardware and/or the communication module 228 of the mobile device 200. In response, the mobile device 200 may transmit a response or confirmation to the charging system 100 using communication module 228, thereby establishing the wireless communication 240 with the charging system 100. Other methods of establishing wireless connections between the charging system 100 and mobile devices may be implemented. For example, a handshake or authentication process may be implemented. Further, any device, including the first wireless charging apparatus 102 or the mobile device 200, may initiate the respective wireless connections, and additional or fewer communications and/or operations may be performed in order to establish the wireless communication 240.

The mobile device 200, as well as the first wireless charging apparatus 102, may include an energy storage device, such as the battery 244. The battery 244 may be configured to provide energy or otherwise power the mobile device 200. The battery 244 may be any suitable type of battery including, but not limited to, wet cells, dry cells, lead-acid, lithium, lithium hydride, lithium ion, or the like, at any suitable voltage and/or output current. In certain embodiments, the battery 244 may be rechargeable and may be recharged by one or more other power sources, such as the mobile device 200. The battery 244 may be configured to receive and store energy, and to power the mobile device 200.

The first wireless charging apparatus 102 and the mobile device 200 may include a respective resonator 146, 238. Each resonator 146, 238 may be any suitable resonator configured to provide, distribute, transmit, or receive energy. For example, the resonator 146 of the first wireless charging apparatus 102 may be configured to transmit, emit, or otherwise transfer energy wirelessly, and the resonator 238 of the mobile device 200 may be configured to receive the energy transmitted by the resonator 146 of the first wireless charging apparatus 102. The resonators 146, 238 may be electromagnetic resonators in one example. The resonator 238 of the mobile device 200 may be electrically coupled to the battery 244 of the mobile device 200, and may be configured to charge, recharge, and/or provide energy to the battery 244. Other wireless charging technologies, including infrared (IR), capacitive, or other technologies, may be incorporated into the first wireless charging apparatus 102 and the mobile device 200.

The first wireless charging apparatus 102 may include the power amplifier 148 and the power supply 150. The power amplifier 148 and the power supply 150 may be electrically coupled to the resonator 146 of the first wireless charging apparatus 102, and may energize the resonator 146 such that the resonator 146 may wirelessly transfer power. The power supply 150 may be a battery or a connection to an external power source, for example. The power supply 150 may further include AC/DC power conversion capabilities and/or converters. The external power supply may be power provided from a power outlet, in one example. The connection between the first wireless charging apparatus 102 and the external power supply may be a standard wall outlet, a Universal Serial Bus connection, a FIREWIRE™ or LIGHTNING™ connection, or any other connection configured to deliver power to the first wireless charging apparatus 102. In some embodiments, the power supply 150 may be an intermediary between the first wireless charging apparatus 102 and the external power supply. The power amplifier 148 may amplify energy from the power supply 150 to ensure that the resonator 146 has sufficient energy to wirelessly transmit or distribute energy. For example, the power amplifier 148 may provide current in order to generate flux, thereby inducing voltage at the resonator 146.

Figure 3:
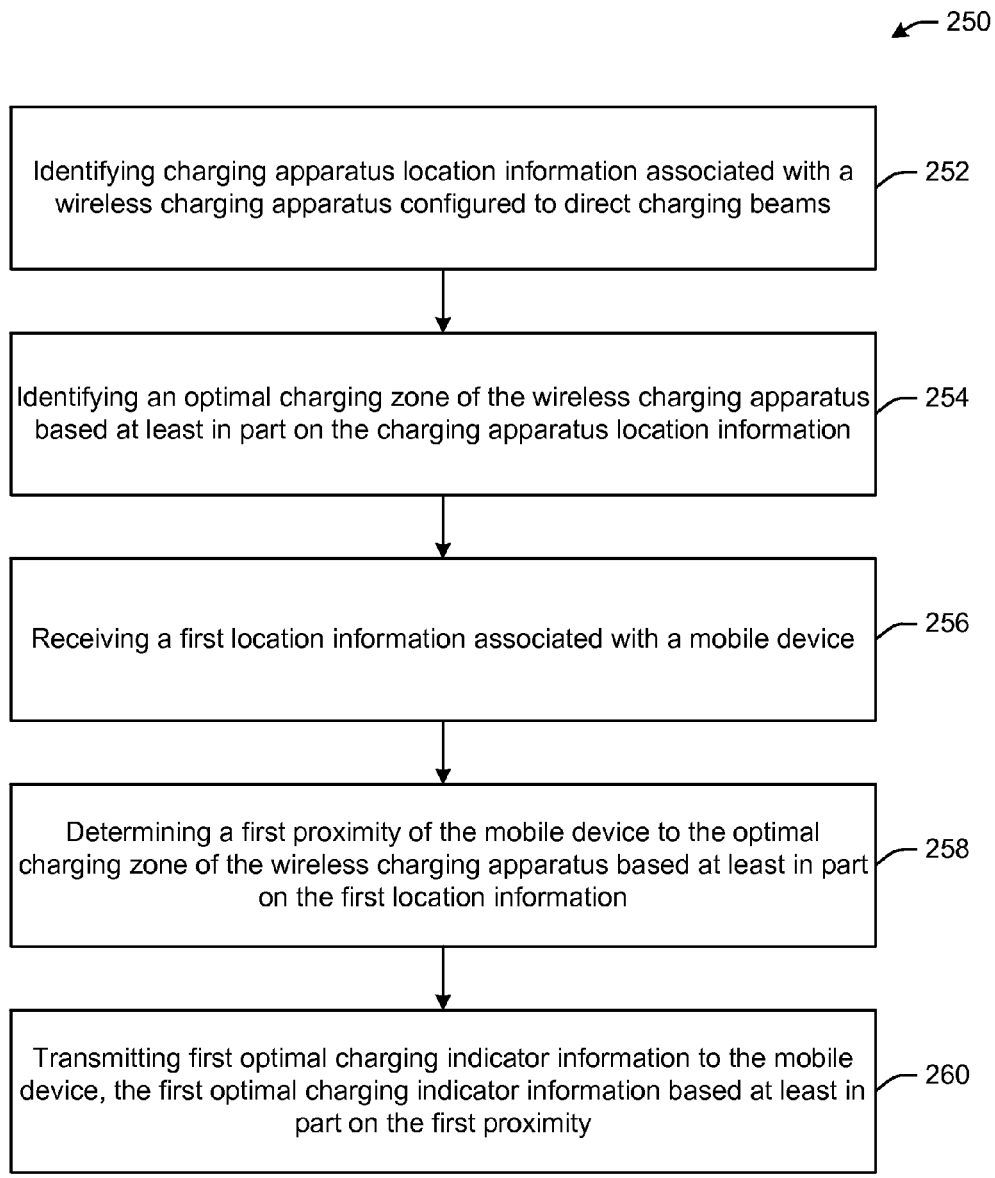
FIG. 3 is a flow diagram illustrating an example method for optimizing wireless charging, in accordance with certain example embodiments of the disclosure.

Referring now to FIG. 3, an example method 250 for optimizing wireless charging according to one embodiment of the disclosure is illustrated and will be discussed in conjunction with the illustrated embodiment of FIG. 1. Referring first to FIG. 3, the method 250 illustrates an example method for optimizing wireless charging, in accordance with certain embodiments of the disclosure. The method 250 may be performed by a charging system having features disclosed herein, for example, the charging system 100 of FIG. 1. Block 252 of the method 250 includes identifying the charging apparatus location information associated with a wireless charging apparatus configured to direct charging beams. For example, with reference now to FIG. 1, the user 120 may bring the mobile device 200 near the charging system 100. The mobile device 200 may transmit a charge request to the charging system 100. The charge request may request a wireless charge from the charging system 100. The charge request may include power allotment information, such as a minimum receivable charge or power allotment and a maximum receivable charge or power allotment, corresponding to the minimum and maximum power the mobile device 200 may receive. Once the mobile device 200 is within the total coverage area 104, the charging controller 142 may direct the first wireless charging apparatus 102 to charge the mobile device 200, based at least in part on the charge request, and in some embodiments, based at least in part on a proximity of the mobile device 200 to the optimal charging zone 106. In FIG. 1, the remote server 160 may include the charging controller 142, which may identify location information associated with the first wireless charging apparatus 102. In some embodiments, the charging controller 142 may cause the remote server 160 to transmit a request for location information to the first wireless charging apparatus 102. In response, the first wireless charging apparatus 102 may transmit the requested location information to the remote server 160. In other embodiments, the remote server 160 may have location information associated with the first wireless charging apparatus 102 saved in a local or a remote database or lookup table. In such embodiments, the charging controller 142 may cause the remote server 160 to retrieve the location information associated with the first wireless charging apparatus 102 from the database. In other embodiments, as discussed above, the charging controller 142 may be associated with or integrated into the first wireless charging apparatus 102. In such embodiments, the charging controller 142 may have the desired location information stored locally, for example, on the memory 136 of the first wireless charging apparatus 102. As described herein, the location information identified by the charging controller 142 may include information associated with the positioning of the first wireless charging apparatus 102 such as, but not limited to, GPS coordinates of the first wireless charging apparatus 102.

At block 254, the method 250 includes identifying an optimal charging zone of the wireless charging apparatus based at least in part on the charging apparatus location information. In FIG. 1, the charging controller 142 may identify the optimal charging zone 106 of the first wireless charging apparatus 102. The charging controller 142 may identify the optimal charging zone 106 based at least in part on the first charging apparatus location information. For example, using the location information of the first wireless charging apparatus 102, the charging controller 142 may identify a current configuration or settings related to the charging beams directed by the first wireless charging apparatus 102, and may identify the optimal charging zone 106. In one example, the charging controller 142 may have identified the location of the first wireless charging apparatus 102, and may further identify the optimal charging zone 106 by determining that the optimal charging zone 106 is positioned approximately below the first wireless charging apparatus 102 and extending a distance of 5 meters. In some embodiments, the charging controller 142 may transmit a request for charging beam information, such as charging beam orientation and/or charging beam direction, to the first wireless charging apparatus 102. The first wireless charging apparatus 102 may transmit, in response to the request from the charging controller 142, charging beam information including orientation, such as the signal strength, phase and/or magnitude, or natural frequency of the charging beams directed by the first wireless charging apparatus 102, the directionality of the charging beams directed by the first wireless charging apparatus 102, the settings and/or current configuration parameters of the first wireless charging apparatus 102 (e.g., whether the first wireless charging apparatus 102 is configured to have a static or dynamic optimal charging zone), the current charging load and/or capacity on the first wireless charging apparatus 102, or other information regarding the charging beams directed by the first wireless charging apparatus 102. Using at least the location information of the first wireless charging apparatus 102, the charging controller 142 may identify the optimal charging zone 106 of the first wireless charging apparatus 102.

Block 256 of FIG. 3 includes receiving a first location information associated with a mobile device. In FIG. 1, the mobile device 200 may transmit the first location information associated with the mobile device 200 to the charging controller 142. In some embodiments, the mobile device 200 may transmit the first location information to the remote server 160, while in other embodiments the mobile device 200 may transmit the first location information to the first wireless charging apparatus 102. The first location information may be aggregated, collected, and/or determined, for example, by the location module 230 of the mobile device 200. As discussed above with respect to the charging apparatus location information, the first location information associated with the mobile device 200 may include current absolute and/or relative positioning information of the mobile device 200, including orientation of the mobile device 200. However, while the charging apparatus location information may be fixed, and thus in some embodiments may be stored in a database and accessed by the charging controller 142, the location information associated with the mobile device 200 may be dynamic or continuously variable, and may therefore be provided by the mobile device 200. In one example, the charging controller 142 may cause the remote server 160 to transmit a request for location information to the mobile device 200. The mobile device 200 may receive the request, and in response, the mobile device 200 may transmit the first location information to the charging controller 142.

At block 258 in FIG. 3, the method 250 includes determining a first proximity of the mobile device to the optimal charging zone of the wireless charging apparatus based at least in part on the first location information. For example, in FIG. 1, the charging controller 142 may determine the proximity of the mobile device 200 to the optimal charging zone 106, based at least in part on the first location information of the mobile device 200. In some embodiments, where the mobile device 200 is outside of the total coverage area 104, the charging controller 142 may determine a proximity of the mobile device 200 to the total coverage area 104 before determining a proximity of the mobile device 200 to the optimal charging zone 106. The proximity of the mobile device 200 to the optimal charging zone 106 may be the distance between the mobile device 200 and an outer boundary of the optimal charging zone 106. In some embodiments, the outer boundary of the optimal charging zone 106 or the total coverage area 104 may be determined at a positioning, for example a vertical positioning, of the mobile device 200 with respect to the first wireless charging apparatus 102 (e.g., 5 meters below the wireless charging apparatus). In one example, the optimal charging zone 106 may approximate a radial or conical geometry, and the charging controller 142 may determine a center point of the optimal charging zone 106 and an associated optimal charging radius. Using the center point and the optimal charging radius, the charging controller 142 may determine a perimeter, or in some instances a circumference or other boundary, of the optimal charging zone 106 at a vertical positioning of the mobile device 200. For example, the charging controller 142 may determine that, based on the location information of the first wireless charging apparatus 102 and the mobile device 200, that the mobile device 200 is about 4 meters below, on a vertical axis, the first wireless charging apparatus 102. The charging controller 142 may determine a perimeter of the optimal charging zone 106 at a distance of about 4 meters away from the first wireless charging apparatus 102. Using this determination, the charging controller 142 may therefore determine the first proximity to be about 4 meters. In other embodiments, the optimal charging zone 106 may have alternate geometries, and therefore the perimeter of the optimal charging zone 106 may be used in determining the first proximity. As discussed herein, the charging system 100 may also be configured to determine a proximity to the total coverage area 104 using similar methods in instances where the mobile device 200 is outside of the total coverage area 104.

Block 260 of the method 250 includes transmitting first optimal charging indicator information to the mobile device, the first optimal charging indicator information based at least in part on the first proximity. In some embodiments, the first optimal charging indicator information may include proximity information associated with the first proximity, and directional guidance information associated with a direction of the optimal charging zone with respect to the mobile device. In FIG. 1, the charging controller 142 may transmit the first optimal charging indicator information to the mobile device 200, which may present the information via user interface 202, based at least in part on the proximity of the mobile device 200 to the optimal charging zone 106. Although the first user interface 202 is illustrated as presented on a display of the mobile device 200, in other embodiments the first optimal charging indicator information may be communicated to the user 120 via audio or vibration, for example. The first optimal charging indicator information may include data transmitted to the mobile device 200. The mobile device 200 may receive the first optimal charging indicator information and, using the charging optimization module 234, may convert the received first optimal charging indicator information into presentable graphics or information, as shown on the user interface 202 of FIG. 1. The first optimal charging indicator information may include directional guidance 204, proximity information 206, optimization percentage information 208, and/or optimization level information 210, as well as other information.

Directional guidance 204 may indicate a direction of the optimal charging zone 106 with respect to the current position of the mobile device 200. Using the directional guidance 204, the user 120 may be able to move the mobile device 200 in a direction that brings the mobile device 200 closer to the optimal charging zone 106. Directional guidance 204 may be three-dimensional, thereby indicating to the user 120 a vertical positioning adjustment that may bring the mobile device 200 closer to the optimal charging zone 106. For example, if the mobile device 200 is on the floor, it may simply need to be raised to a higher position to enter the optimal charging zone 106. Proximity information 206 may indicate a distance between the current position of the mobile device 200 and an outer boundary of the total coverage area 104, and/or a distance between the current position of the mobile device 200 and an outer boundary of the optimal charging zone 106. Optimization percentage information 208 may indicate a current percentage optimization of wireless charge being received by the mobile device 200 from the first wireless charging apparatus 102. The optimization percentage information 208 may be determined, for example, by the charging optimization module 234 of the mobile device 200. In one example, the optimization percentage information 208 may be a charging efficiency comparing the current wireless charge being received by the mobile device 200 as an increase in stored energy over time against a baseline, which may be, for example, wired charging. In another example, the optimization percentage information 208 may be determined by analyzing historical charge data for devices charged by the first wireless charging apparatus 102 and determining a current charging efficiency of the mobile device 200. In yet another example, the optimization percentage information 208 may be determined by comparing a charging output at the first wireless charging apparatus 102 with a received charge at the mobile device 200. The optimization percentage information 208 may be updated periodically, or may be triggered, for example, by movement of the mobile device 200.

Optimization level information 210 may indicate a graphical representation of the optimization percentage information 208, in some embodiments. The optimization level information 210 may also account for current load at the first wireless charging apparatus 102. For example, the optimization level information 210 may be a bar graph, as illustrated, and may be color coded to indicate to the user 120 that other mobile devices are being charged by the first wireless charging apparatus 102. For example, if there is one other device being charged by the first wireless charging apparatus 102, half of the bar graph may be black, indicating to the user 120 that there is another device being charged. If the first wireless charging apparatus 102 is congested, the user 120 may decide to move and connect to another wireless charging apparatus that is less congested.

After receiving and presenting the first optimal charging indicator information from the charging controller 142, the mobile device 200 may be moved to a second location by the user 120, who may be acting on the first optimal charging indicator information in order to place the mobile device 200 in the optimal charging zone 106. Accordingly, the mobile device 200 may transmit a second location information to the charging controller 142. The charging controller 142 may receive the second location information associated with the mobile device, and may determine a second proximity of the mobile device 200 to the optimal charging zone 106 of the first wireless charging apparatus 102 based at least in part on the second location information. In some embodiments, the charging controller 142 may transmit a request to the mobile device 200 for the second location information, while in other embodiments the mobile device 200 may automatically transmit the second location information to the charging controller 142 periodically or upon movement of the mobile device 200. Upon determining the second proximity, the charging controller 142 may transmit a second optimal charging indicator information to the mobile device 200, the second optimal charging indicator information based at least in part on the second proximity. In some embodiments, the charging controller 142 may determine that the second proximity is zero, or that the mobile device 200 is positioned at or within the optimal charging zone 106. In such instances, the charging controller 142 may transmit an optimized charging indicator to the mobile device 200, the optimized charging indicator based at least in part on the second proximity. The optimized charging indicator may indicate that the mobile device 200 is positioned within the optimal charging zone 106. An illustration of one embodiment of the optimized charging indicator is provided in FIG. 4 and discussed below. It should be noted, that the method 250 may be modified in various ways in accordance with certain embodiments of the disclosure. For example, one or more operations of the method 250 may be eliminated or executed out of order in other embodiments of the disclosure. Additionally, other operations may be added to the method 250 in accordance with other embodiments of the disclosure.

Figure 4:
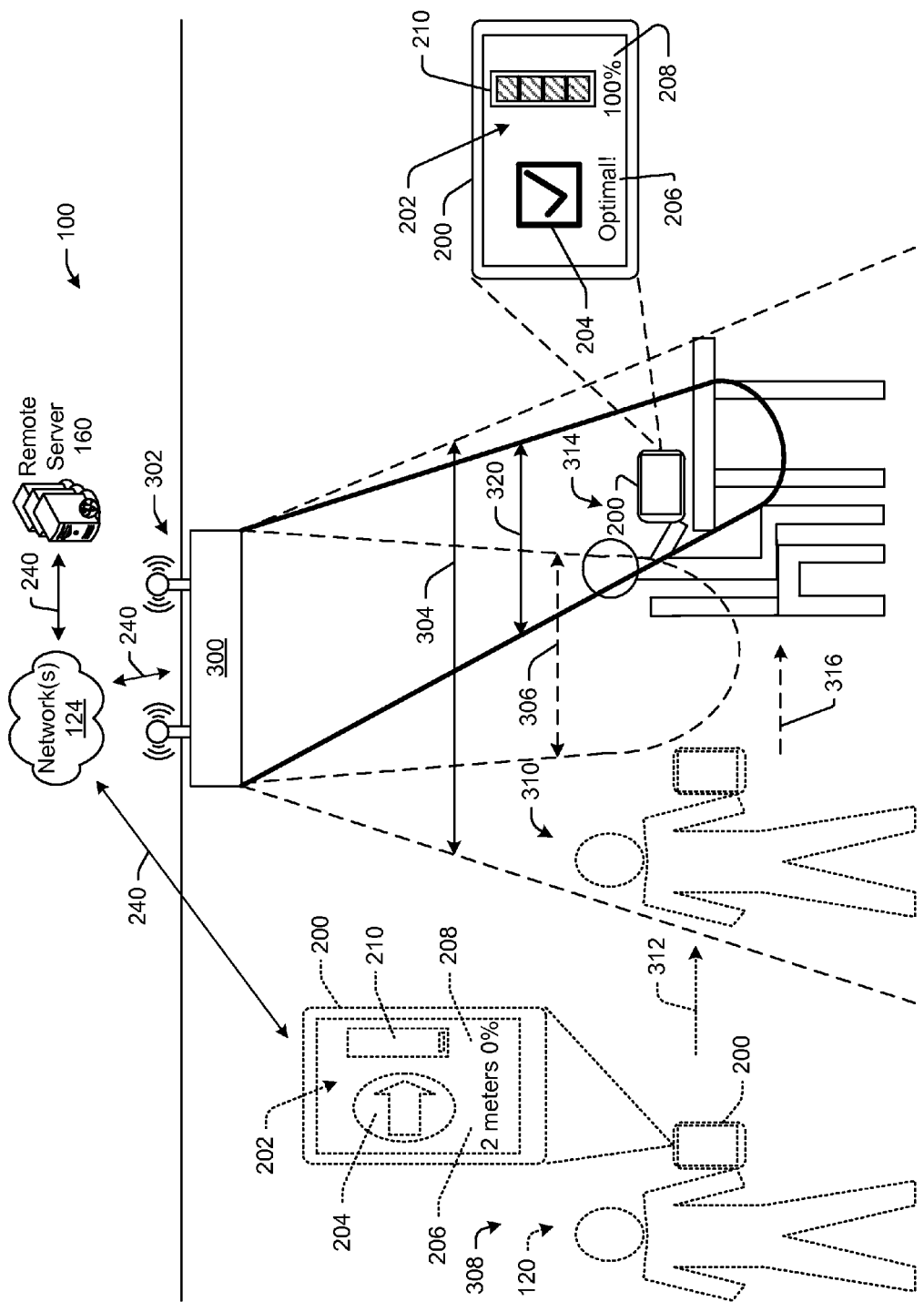
FIG. 4 is an illustrative schematic diagram of another wireless charging environment, in accordance with certain example embodiments of the disclosure.
Figure 5:
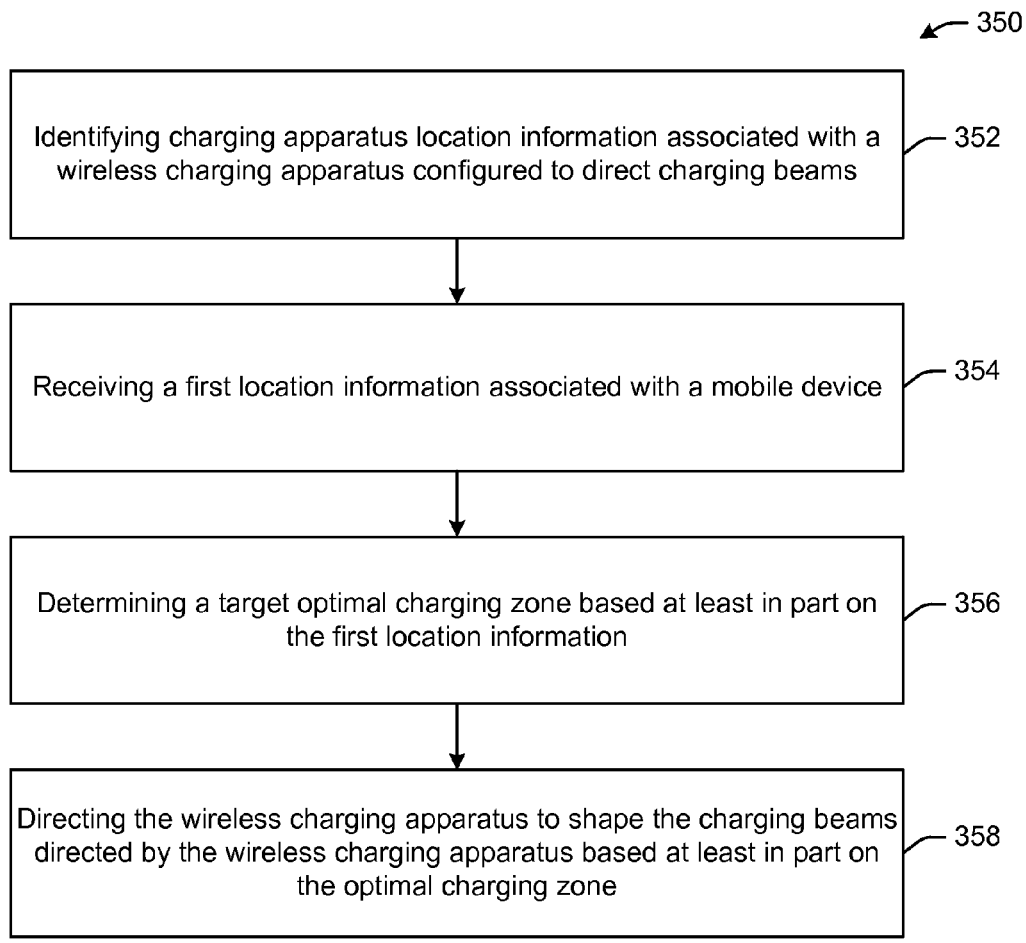
FIG. 5 is a flow diagram illustrating another example method for optimizing wireless charging, in accordance with certain example embodiments of the disclosure.

Referring now to FIGS. 4 and 5, FIG. 4 illustrates another embodiment of the charging system 100 with a wireless charging apparatus having a dynamic optimal charging zone, as discussed above. In FIG. 5, another embodiment of a method 350 for optimizing wireless charging is illustrated. FIGS. 4 and 5 will be discussed in conjunction with each other. FIG. 4 includes the charging system 100 with a third wireless charging apparatus 300 and the user 120 with the mobile device 200, where the third wireless charging apparatus 300 and the mobile device 200 are in communication with the remote server 160. The remote server 160 may be the remote server 160 illustrated in FIG. 2, and may include the charging controller 142 in some embodiments. In other embodiments, the charging system 100 may not include the remote server 160, and the third wireless charging apparatus 300 may include the charging controller 142. In some other embodiments, the mobile device 200 may include the charging controller 142 instead of, or in addition to, either or both of the third wireless charging apparatus 300 and the remote server 160. The third wireless charging apparatus 300 may be a wireless charging apparatus with a dynamic optimal charging zone. The third wireless charging apparatus 300 may include a dynamic charging beam distribution device 302, which may be configured to allow the third wireless charging apparatus 300 to change the shape of charging beams directed by the third wireless charging apparatus 300. The third wireless charging apparatus 300 may have a total coverage area 304 and an initial optimal charging zone 306. The third wireless charging apparatus 300 may be configured to move, redistribute, shift, adjust, or otherwise modify the placement and/or location of the initial optimal charging zone 306. The third wireless charging apparatus 300 may modify the initial optimal charging zone 306 by, for example, adjusting a natural frequency, phase and/or magnitude of the charging beams directed by the third wireless charging apparatus 300 using the dynamic charging beam distribution device 302. The initial optimal charging zone 306 may be adjusted to a position anywhere within the total coverage area 304.

In FIG. 4, the user 120 may have the mobile device 200 at a first position 308. At the first position 308, the charging system 100 may implement the method 250 of FIG. 3, and the mobile device 200 may present the user interface 202 to the user 120. For example, the user interface 202 may indicate directional guidance 204 that the total coverage area 304 is positioned at a certain direction away from the current first position 308 of the mobile device 200. The user interface 202 may also indicate proximity information 206 to the user 120, indicating that the mobile device 200 is positioned 2 meters away from the total coverage area 304. The user interface 202 may indicate that the optimization percentage information 208 of wireless charge being received from the third wireless charging apparatus 300 is 0% because the mobile device 200 is outside of the total coverage area 304, and that the optimization level information 210 of wireless charge being received from the third wireless charging apparatus 300 is zero. In response, the user 120 may move the mobile device 200 in direction 312 to a second position 310, which is within the total coverage area 304 and more specifically, outside of the initial optimal charging zone 306. The charging controller 142 may again implement the method 250 of FIG. 3, and the mobile device 200 may present the user interface, this time indicating directional guidance and proximity to the initial optimal charging zone 306. The user 120 may then move the mobile device in direction 316 to reach the initial optimal charging zone 306. However, once within the initial optimal charging zone 306, the user 120 may desire to sit at the table and may move the mobile device 200 to a third position 314. The third position 314 may still be within the total coverage area 304, but outside of the initial optimal charging zone 306. In such an instance, the charging controller 142 may actively modify or adjust the optimal charging zone of the third wireless charging apparatus 300, such that the mobile device 200 remains within the optimal charging zone, using, in one example, the method 350, as well as other methods and apparatuses described herein.

Referring now to FIG. 5, block 352 of the method 350 includes identifying charging apparatus location information associated with a wireless charging apparatus configured to direct charging beams. For example, referring back to FIG. 4, the remote server 160 may include the charging controller 142 discussed above. In some embodiments, the charging controller 142 may be the third wireless charging apparatus 300 rather than at the remote server 160. The charging controller 142 may identify location information associated with the third wireless charging apparatus 300, as discussed above.

At block 354, the method 350 includes receiving a first location information associated with a mobile device. For example, in FIG. 4, the charging controller 142 of the remote server 160 may receive the first location information associated with the mobile device 200, as described in detail above. The charging controller 142 may receive the location information associated with the mobile device 200 while at the third position 314. In some embodiments, the location information may be associated with a position within the total coverage area 304 of the third wireless charging apparatus 300.

At block 356, the method 350 includes determining a target optimal charging zone based at least in part on the first location information. In FIG. 4, the charging controller 142 may determine a target optimal charging zone that corresponds with the location information of the mobile device 200 at the third position 314, such that the mobile device 200 will be positioned in the target optimal charging zone. For example, the target optimal charging zone may be determined to be target optimal charging zone 320, where the mobile device 200 is positioned at the center of, or otherwise within, the target optimal charging zone 320.

At block 358 of FIG. 5, the method 350 includes directing the wireless charging apparatus to shape the charging beams directed by the wireless charging apparatus based at least in part on the optimal charging zone. Referring back to FIG. 4, the charging controller 142 may direct the third wireless charging apparatus 300 to shape the charging beams directed by the third wireless charging apparatus 300 to move the initial optimal charging zone 306 to the target optimal charging zone 320, such that the mobile device 200 is in the target optimal charging zone 320. In FIG. 4, third wireless charging apparatus 300 may include the charging controller 142 shown in FIG. 4, and may transmit an optimized charging indicator to the mobile device 200, with the directional guidance 204 indicating that the mobile device 200 is in the optimal charging zone, and the proximity information 206 indicating that the mobile device 200 is in the optimal charging zone. The optimization percentage information 208 may indicate that the charging efficiency is above a certain predetermined threshold, for example, 80%, 90%, or 100%. The optimization level information 210 may graphically depict a high level of charging optimization. In instances where multiple mobile devices are being charged by the third wireless charging apparatus 300, the charging controller 142 may determine the target optimal charging zone to maximize a charging efficiency for both connected mobile devices. The charging controller 142 may direct the third wireless charging apparatus 300 to charge the mobile device 200.

In some embodiments, the charging controller 142 may periodically request updated location information from the mobile device 200, and may adjust the target optimal charging zone based at least in part thereon, while in other embodiments, the mobile device 200 may periodically send updated location information to the charging controller 142. In other embodiments, the mobile device 200 may be automatically triggered to send location information to the charging controller 142, based on the movement of the mobile device 200, a change in the wireless charge percentage or level, or another factor. In some embodiments, the charging system 100 of FIG. 4 may include a plurality of wireless charging apparatuses, and may select one of the plurality of wireless charging apparatuses to charge the mobile device 200. For example, the wireless charging apparatus closest to the mobile device 200, or the wireless charging apparatus with the lightest load, may be selected by the charging controller 142.

It should be noted, that the method 350 may be modified in various ways in accordance with certain embodiments of the disclosure. For example, one or more operations of the method 350 may be eliminated or executed out of order in other embodiments of the disclosure. Additionally, other operations may be added to the method 350 in accordance with other embodiments of the disclosure.

The methods and systems described herein may result in increased functionality or optimal wireless charging of charging systems by allowing mobile devices to be positioned within optimal charging zones. In some embodiments, the charging system may guide a mobile device to an optimal charging zone. In some embodiments, the charging system may adjust an optimal charging zone to encompass a mobile device.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device, or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

According to example embodiments of the disclosure, there may be a method. The method may include identifying charging apparatus location information associated with a wireless charging apparatus configured to direct charging beams, and identifying an optimal charging zone of the wireless charging apparatus based at least in part on the charging apparatus location information. The method may include receiving a first location information associated with a mobile device, determining a first proximity of the mobile device to the optimal charging zone of the wireless charging apparatus based at least in part on the first location information, and transmitting first optimal charging indicator information to the mobile device. The first optimal charging indicator information may be based at least in part on the first proximity. The method may include receiving a second location information associated with the mobile device, and determining a second proximity of the mobile device to the optimal charging zone of the wireless charging apparatus based at least in part on the second location information. The method may include transmitting a second optimal charging indicator information to the mobile device, the second optimal charging indicator information based at least in part on the second proximity. The method may include transmitting an optimized charging indicator to the mobile device, the optimized charging indicator based at least in part on the second proximity. The first optimal charging indicator information may include proximity information associated with the first proximity, and direction information associated with a direction of the optimal charging zone with respect to the mobile device. The direction information may include three-dimensional directional information. The first optimal charging indicator information may include a charging optimization indication associated with a current percentage of charging optimization. The method may also include receiving a charge request from the mobile device, and directing the wireless charging apparatus to charge the mobile device based at least in part on the charge request and the first proximity. The charging controller may be integrated into the wireless charging apparatus. The method may also include charging, by the wireless charging apparatus, the mobile device.

According to some embodiments of the disclosure, there may be a method. The method may include identifying charging apparatus location information associated with a wireless charging apparatus configured to direct charging beams, and receiving a first location information associated with a mobile device. The method may include determining an optimal charging zone based at least in part on the first location information, and directing the wireless charging apparatus to shape the charging beams directed by the wireless charging apparatus based at least in part on the optimal charging zone. The charging beams may be shaped by adjusting a natural frequency, a phase, or a magnitude of the charging beams directed by the wireless charging apparatus. The method may also include selecting the wireless charging apparatus from a plurality of available wireless charging apparatuses. The method may also include determining a proximity of the mobile device to the optimal charging zone based at least in part on the first location information. The method may also include determining a total coverage area of the wireless charging apparatus based at least in part on the charging apparatus location information, determining a first proximity of the mobile device to the total coverage area of the wireless charging apparatus based at least in part on the first location information, and transmitting a first optimal charging indicator information to the mobile device. The first optimal charging indicator information may be based at least in part on the first proximity. The method may also include receiving a second location information associated with the mobile device, and determining a second proximity of the mobile device to the total coverage area of the wireless charging apparatus based at least in part on the second location information. The method may also include transmitting a second optimal charging indicator information to the mobile device, the second optimal charging indicator information based at least in part on the second proximity. The first optimal charging indicator information may include proximity information associated with the first proximity, and direction information associated with a direction of the optimal charging zone with respect to the mobile device. The method may also include receiving a charge request from the mobile device, and directing the wireless charging apparatus to charge the mobile device based at least in part on the charge request and the first proximity. The charging controller may be integrated into the wireless charging apparatus.

In example embodiments of the disclosure, there may be a wireless charging apparatus. The wireless charging apparatus may include a power supply, a power distribution device configured to wirelessly charge connected mobile devices, at least one memory that stores computer-executable instructions, and a charging controller including one or more processors configured to access the at least one memory. The one or more processors may be configured to execute the computer-executable instructions to identify charging apparatus location information associated with the wireless charging apparatus, and to identify an optimal charging zone of the wireless charging apparatus based at least in part on the charging apparatus location information. The one or more processors may be configured to receive a first location information associated with a mobile device, determine a first proximity of the mobile device to the optimal charging zone of the wireless charging apparatus based at least in part on the first location information, and transmit first optimal charging indicator information to the mobile device. The first optimal charging indicator information may be based at least in part on the first proximity. The one or more processors may be further configured to receive a second location information associated with the mobile device, and determine a second proximity of the mobile device to the optimal charging zone of the wireless charging apparatus based at least in part on the second location information. The one or more processors may be further configured to transmit a second optimal charging indicator information to the mobile device, the second optimal charging indicator information based at least in part on the second proximity. The one or more processors may be further configured to transmit an optimized charging indicator to the mobile device, the optimized charging indicator based at least in part on the second proximity. The first optimal charging indicator information may include proximity information associated with the first proximity, and direction information associated with a direction of the optimal charging zone with respect to the mobile device. The direction information may include three-dimensional directional information. The first optimal charging indicator information may further include a charging optimization indication associated with a current percentage of charging optimization. The one or more processors may be further configured to receive a charge request from the mobile device, and to direct the wireless charging apparatus to charge the mobile device based at least in part on the charge request and the first proximity. The charging controller may be integrated into the wireless charging apparatus. The one or more processors may be further configured to charge the mobile device.

In example embodiments of the disclosure, there may be a wireless charging system. The charging system may include at least one memory that stores computer-executable instructions, and one or more processors configured to access the at least one memory. The one or more processors may be configured to execute the computer-executable instructions to identify charging apparatus location information associated with the wireless charging apparatus, and identify an optimal charging zone of the wireless charging apparatus based at least in part on the charging apparatus location information. The one or more processors may be further configured to receive a first location information associated with a mobile device, determine a first proximity of the mobile device to the optimal charging zone of the wireless charging apparatus based at least in part on the first location information, and transmit first optimal charging indicator information to the mobile device. The first optimal charging indicator information may be based at least in part on the first proximity. The one or more processors may be further configured to receive a second location information associated with the mobile device, and determine a second proximity of the mobile device to the optimal charging zone of the wireless charging apparatus based at least in part on the second location information. The one or more processors may be further configured to transmit a second optimal charging indicator information to the mobile device, the second optimal charging indicator information based at least in part on the second proximity. The one or more processors may be further configured to transmit an optimized charging indicator to the mobile device, the optimized charging indicator based at least in part on the second proximity. The first optimal charging indicator information may include proximity information associated with the first proximity, and direction information associated with a direction of the optimal charging zone with respect to the mobile device. The direction information may include three-dimensional directional information. The first optimal charging indicator information may further include a charging optimization indication associated with a current percentage of charging optimization. The one or more processors may be further configured to receive a charge request from the mobile device, and direct the wireless charging apparatus to charge the mobile device based at least in part on the charge request and the first proximity. The charging controller may be integrated into the wireless charging apparatus. The one or more processors may be further configured to charge the mobile device.

In another example embodiment, there is disclosed one or more computer-readable media storing computer-executable instructions. The one or more computer-readable media may store computer-executable instructions that, when executed by one or more processors, configure the one or more processors to perform a method. The method may include identifying charging apparatus location information associated with a wireless charging apparatus configured to direct charging beams, and identifying an optimal charging zone of the wireless charging apparatus based at least in part on the charging apparatus location information. The method may further include receiving a first location information associated with a mobile device, determining a first proximity of the mobile device to the optimal charging zone of the wireless charging apparatus based at least in part on the first location information, and transmitting first optimal charging indicator information to the mobile device. The first optimal charging indicator information may be based at least in part on the first proximity. The one or more processors of the one or more computer-readable media may execute the computer-executable instructions to perform the operations including receiving a second location information associated with the mobile device, and determining a second proximity of the mobile device to the optimal charging zone of the wireless charging apparatus based at least in part on the second location information. The one or more processors of the one or more computer-readable media may execute the computer-executable instructions to perform the operations including transmitting a second optimal charging indicator information to the mobile device, the second optimal charging indicator information based at least in part on the second proximity. The one or more processors of the one or more computer-readable media may execute the computer-executable instructions to perform the operations including transmitting an optimized charging indicator to the mobile device, the optimized charging indicator based at least in part on the second proximity. The first optimal charging indicator information may include proximity information associated with the first proximity, and direction information associated with a direction of the optimal charging zone with respect to the mobile device. The direction information may include three-dimensional directional information. The first optimal charging indicator information may further include a charging optimization indication associated with a current percentage of charging optimization. The one or more processors of the one or more computer-readable media may execute the computer-executable instructions to perform the operations including receiving a charge request from the mobile device, and directing the wireless charging apparatus to charge the mobile device based at least in part on the charge request and the first proximity. The charging controller may be integrated into the wireless charging apparatus. The one or more processors of the one or more computer-readable media may execute the computer-executable instructions to perform the operations including charging the mobile device.

In example embodiments of the disclosure, there may be a wireless charging apparatus. The wireless charging apparatus may include a means for identifying charging apparatus location information associated with the wireless charging apparatus, and a means for identifying an optimal charging zone of the wireless charging apparatus based at least in part on the charging apparatus location information. The wireless charging apparatus may include a means for receiving a first location information associated with a mobile device, and determine a first proximity of the mobile device to the optimal charging zone of the wireless charging apparatus based at least in part on the first location information. The wireless charging apparatus may further include a means for transmitting first optimal charging indicator information to the mobile device. The first optimal charging indicator information may be based at least in part on the first proximity. The wireless charging apparatus may further include a means for receiving a second location information associated with the mobile device, and a means for determining a second proximity of the mobile device to the optimal charging zone of the wireless charging apparatus based at least in part on the second location information. The wireless charging apparatus may further include a means for transmitting a second optimal charging indicator information to the mobile device, the second optimal charging indicator information based at least in part on the second proximity. The wireless charging apparatus may further include a means for transmitting an optimized charging indicator to the mobile device, the optimized charging indicator based at least in part on the second proximity. The first optimal charging indicator information may include proximity information associated with the first proximity, and direction information associated with a direction of the optimal charging zone with respect to the mobile device. The direction information may include three-dimensional directional information. The first optimal charging indicator information may further include a charging optimization indication associated with a current percentage of charging optimization. The wireless charging apparatus may further include a means for receiving a charge request from the mobile device, and a means for directing the wireless charging apparatus to charge the mobile device based at least in part on the charge request and the first proximity. The charging controller may be integrated into the wireless charging apparatus. The wireless charging apparatus may further include a means for charging the mobile device.

What is claimed is:
1. A method for optimizing wireless charging comprising:
identifying, by a charging controller, charging apparatus location information associated with a wireless charging apparatus configured to direct charging beams;
identifying, by the charging controller, an optimal charging zone of the wireless charging apparatus based at least in part on the charging apparatus location information;
receiving, by the charging controller, a first location information associated with a mobile device;

determining, by the charging controller, a first proximity of the mobile device to the optimal charging zone of the wireless charging apparatus based at least in part on the first location information; and transmitting, by the charging controller, first optimal charging indicator information to the mobile device, the first optimal charging indicator information based at least in part on the first proximity, wherein the first optimal charging indicator information comprises proximity information associated with the first proximity of the mobile device, the proximity information comprising a distance between the mobile device and an outer boundary of the optimal charging zone; and directing, by the charging controller, the wireless charging apparatus to shape the charging beams directed by the wireless charging apparatus based at least in part on the optimal charging zone.

2. The method of claim 1, further comprising:
receiving, by the charging controller, a second location information associated with the mobile device; and
determining, by the charging controller, a second proximity of the mobile device to the optimal charging zone of the wireless charging apparatus based at least in part on the second location information.

3. The method of claim 2, further comprising transmitting, by the charging controller, a second optimal charging indicator information to the mobile device, the second optimal charging indicator information based at least in part on the second proximity.

4. The method of claim 2, further comprising transmitting, by the charging controller, an optimized charging indicator to the mobile device, the optimized charging indicator based at least in part on the second proximity.

5. The method of claim 1, wherein the first optimal charging indicator information comprises proximity information associated with the first proximity, and directional guidance information associated with a direction of the optimal charging zone with respect to the mobile device.

6. The method of claim 5, wherein the directional guidance information comprises three-dimensional direction information.

7. The method of claim 5, wherein the first optimal charging indicator information further comprises a charging optimization indication associated with a current percentage of charging optimization.

8. The method of claim 1, further comprising:
receiving, by the charging controller, a charge request from the mobile device; and
directing, by the charging controller, the wireless charging apparatus to charge the mobile device based at least in part on the charge request and the first proximity.

9. The method of claim 1, wherein the charging controller is integrated into the wireless charging apparatus.

10. The method of claim 1, further comprising charging, by the wireless charging apparatus, the mobile device.

11. A method for optimizing wireless charging comprising:
identifying, by a charging controller, charging apparatus location information associated with a wireless charging apparatus configured to direct charging beams;
receiving, by the charging controller, a first location information associated with a mobile device;
determining, by the charging controller, an optimal charging zone based at least in part on the first location information;
determining, by the charging controller, a first proximity of the mobile device to the optimal charging zone;

sending, by the charging controller, first optimal charging indicator information to the mobile device, the first optimal charging indicator information based at least in part on the first proximity, wherein the first optimal charging indicator information comprises proximity information associated with the first proximity of the mobile device, the proximity information comprising a distance between the mobile device and an outer boundary of the optimal charging zone; and directing, by the charging controller, the wireless charging apparatus to shape the charging beams directed by the wireless charging apparatus based at least in part on the optimal charging zone.

12. The method of claim 11, wherein the charging beams are shaped by adjusting a natural frequency, a phase, or a magnitude of the charging beams directed by the wireless charging apparatus.

13. The method of claim 11, further comprising selecting, by the charging controller, the wireless charging apparatus from a plurality of available wireless charging apparatuses.

14. The method of claim 11, further comprising determining, by the charging controller, a proximity of the mobile device to the optimal charging zone based at least in part on the first location information.

15. The method of claim 11, further comprising:
determining, by the charging controller, a total coverage area of the wireless charging apparatus based at least in part on the charging apparatus location information;
determining, by the charging controller, a first proximity of the mobile device to the total coverage area of the wireless charging apparatus based at least in part on the first location information; and
transmitting, by the charging controller, a first optimal charging indicator information to the mobile device, the first optimal charging indicator information based at least in part on the first proximity.

16. The method of claim 15, further comprising:
receiving, by the charging controller, a second location information associated with the mobile device; and
determining, by the charging controller, a second proximity of the mobile device to the total coverage area of the wireless charging apparatus based at least in part on the second location information.

17. The method of claim 16, further comprising transmitting, by the charging controller, a second optimal charging indicator information to the mobile device, the second optimal charging indicator information based at least in part on the second proximity.

18. The method of claim 15, wherein the first optimal charging indicator information comprises proximity information associated with the first proximity, and directional guidance information associated with a direction of the optimal charging zone with respect to the mobile device.

19. The method of claim 11, further comprising:
receiving, by the charging controller, a charge request from the mobile device; and
directing, by the charging controller, the wireless charging apparatus to charge the mobile device based at least in part on the charge request and the first proximity.

20. A wireless charging apparatus comprising:
a power supply;
a power distribution device configured to wirelessly charge connected mobile devices;
at least one memory that stores computer-executable instructions; and
a charging controller comprising one or more processors configured to access the at least one memory, wherein the one or more processors is configured to execute the computer-executable instructions to:
    identify charging apparatus location information associated with the wireless charging apparatus;
    identify an optimal charging zone of the wireless charging apparatus based at least in part on the charging apparatus location information;
    receive a first location information associated with a mobile device;
    determine a first proximity of the mobile device to the optimal charging zone of the wireless charging apparatus based at least in part on the first location information; and
    transmit first optimal charging indicator information to the mobile device, the first optimal charging indicator information based at least in part on the first proximity wherein the first optimal charging indicator information comprises proximity information associated with the first proximity of the mobile device, the proximity information comprising a distance between the mobile device and an outer boundary of the optimal charging zone.

21. The wireless charging apparatus of claim 20, wherein the one or more processors is further configured to execute the computer-executable instructions to:
    receive a second location information associated with the mobile device; and
    determine a second proximity of the mobile device to the optimal charging zone of the wireless charging apparatus based at least in part on the second location information.

22. A wireless charging apparatus comprising:
a power supply;
a power distribution device configured to wirelessly charge connected mobile devices;
at least one memory that stores computer-executable instructions; and
a charging controller comprising one or more processors configured to access the at least one memory, wherein the one or more processors is configured to execute the computer-executable instructions to:
    identify charging apparatus location information associated with the wireless charging apparatus;
    receive a first location information associated with a mobile device;
    determine an optimal charging zone based at least in part on the first location information;
    determine a first proximity of the mobile device to the optimal charging zone;
    transmit first optimal charging indicator information to the mobile device, the first optimal charging indicator information based at least in part on the first proximity, wherein the first optimal charging indicator information comprises proximity information associated with the first proximity of the mobile device, the proximity information comprising a distance between the mobile device and an outer boundary of the optimal charging zone; and
    direct the wireless charging apparatus to shape the charging beams directed by the wireless charging apparatus based at least in part on the optimal charging zone.

23. The wireless charging apparatus of claim 22, wherein the charging beams are shaped by adjusting a natural frequency, a phase, or a magnitude of the charging beams directed by the wireless charging apparatus.

* * * * *